(12) United States Patent
Cai et al.

(10) Patent No.: US 9,100,381 B2
(45) Date of Patent: Aug. 4, 2015

(54) METHOD AND APPARATUS FOR PROVIDING VIRTUAL WI-FI ACCESS

(75) Inventors: Yigang Cai, Naperville, IL (US); Suzann Hua, Lisle, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 558 days.

(21) Appl. No.: 12/023,255

(22) Filed: Jan. 31, 2008

(65) Prior Publication Data
US 2009/0198808 A1 Aug. 6, 2009

(51) Int. Cl.
*G06F 15/173* (2006.01)
*H04L 29/06* (2006.01)
*H04L 12/14* (2006.01)
*H04W 12/06* (2009.01)
*H04W 12/04* (2009.01)
*H04W 84/12* (2009.01)

(52) U.S. Cl.
CPC .............. *H04L 63/061* (2013.01); *H04L 12/14* (2013.01); *H04L 12/1403* (2013.01); *H04L 12/1446* (2013.01); *H04L 63/083* (2013.01); *H04W 12/06* (2013.01); *H04W 12/04* (2013.01); *H04W 84/12* (2013.01)

(58) Field of Classification Search
CPC . H04L 63/061; H04L 63/083; H04L 12/1446; H04L 12/1403; H04W 12/06
USPC ........................................................ 709/226
See application file for complete search history.

(56) References Cited

U.S. PATENT DOCUMENTS

| | | | |
|---|---|---|---|
| 7,664,495 B1 | 2/2010 | Bonner et al. | |
| 7,693,507 B2 | 4/2010 | Suzuki et al. | |
| 8,289,936 B2 | 10/2012 | Wang et al. | |
| 8,547,902 B2 * | 10/2013 | Rahman | 370/328 |
| 2005/0175181 A1 * | 8/2005 | Bergs et al. | 380/270 |
| 2005/0190747 A1 | 9/2005 | Sindhwani et al. | |
| 2006/0004643 A1 | 1/2006 | Stadelmann et al. | |
| 2006/0067299 A1 | 3/2006 | Caspi et al. | |
| 2006/0079228 A1 * | 4/2006 | Marsico et al. | 455/433 |
| 2006/0236105 A1 * | 10/2006 | Brok et al. | 713/169 |
| 2006/0258285 A1 | 11/2006 | Riddles | |

(Continued)

FOREIGN PATENT DOCUMENTS

| | | |
|---|---|---|
| CN | 1659909 | 8/2005 |
| JP | 2007180998 | 7/2007 |

OTHER PUBLICATIONS

U.S. Appl. No. 12/023,120, filed Jan. 31, 2008, Yigang Cai.
Tallberg, Mathias, "P2P-based Roaming Between Home WLAN Hotspots", Helsinki University of Technology, Finland, 2006, p. 1-6.
PCT International Search Report dated Sep. 24, 2009.

(Continued)

*Primary Examiner* — Maceeh Anwari
(74) *Attorney, Agent, or Firm* — Fay Sharpe LLP

(57) ABSTRACT

A method of providing virtual Wi-Fi service via a virtual Wi-Fi access network is provided. The method comprises: receiving data from an owner of an individual Wi-Fi access point; updating the owner of the Wi-Fi access point with access IDs, passwords, and security keys for a plurality of virtual Wi-Fi access subscribers; receiving subscriber data from a virtual Wi-Fi access subscriber; providing the subscriber with virtual Wi-Fi access log-in information; connecting the subscriber to the virtual Wi-Fi access network, wherein the virtual Wi-Fi access network comprises a plurality of individual Wi-Fi access points in communication with at least one virtual Wi-Fi access server; and billing the subscriber for virtual Wi-Fi access.

8 Claims, 3 Drawing Sheets

(56) References Cited

U.S. PATENT DOCUMENTS

2007/0242657 A1 10/2007 Waisman-Diamond
2009/0187983 A1 7/2009 Zerfos et al.

OTHER PUBLICATIONS

Ala-Laurila, Juha, et al., "Wireless LAN Access Network Architecture for Mobile Operators", IEEE Communications Magazine, vol. 39, No. 11, Nov. 2001, p. 82-89.

* cited by examiner

METHOD AND APPARATUS FOR PROVIDING VIRTUAL WI-FI ACCESS

BACKGROUND OF THE INVENTION

This invention relates to a method and apparatus for providing virtual Wi-Fi access. While the invention is particularly directed to the art of internet access and telecommunications, and will be thus described with specific reference thereto, it will be appreciated that the invention may have usefulness in other fields and applications.

By way of background, a Wi-Fi enabled device such as a PC, game console, cell phone, MP3 player or PDA can connect to the Internet when within range of a wireless network connected to the Internet. The area covered by one or more interconnected access points is called a hotspot. Hotspots can cover as little as a single room with wireless-opaque walls or as much as many square miles covered by overlapping access points.

Routers which incorporate a DSL or cable modem and a Wi-Fi access point are often used in homes and other premises, and provide Internet access and internetworking to all devices connected wirelessly or by cable into them. Devices supporting Wi-Fi can also be connected in ad-hoc mode for client-to-client connections without a router.

Business and industrial Wi-Fi is now widespread. In business environments, increasing the number of Wi-Fi access points provides redundancy, support for fast roaming and increased overall network capacity by using more channels or creating smaller cells. Wi-Fi enables wireless voice applications (VoWLAN or WVoIP). Over the years, Wi-Fi implementations have moved toward "thin" access points, with more of the network intelligence housed in a centralized network appliance, relegating individual Access Points to be simply "dumb" radios. Outdoor applications may utilize true mesh topologies. Wi-Fi installations can provide a secure computer networking gateway, firewall, DHCP server, intrusion detection system, and other functions.

In addition to restricted use in homes and offices, Wi-Fi is publicly available at Wi-Fi hotspots provided either free of charge or to subscribers to various providers. Free hotspots are often provided by businesses such as hotels, restaurants, and airports who offer the service to attract or assist clients. Sometimes free Wi-Fi is provided by enthusiasts or by organizations or authorities who wish to promote business in their area. Also, Metropolitan-wide Wi-Fi (Muni-Fi) already has more than 300 projects in process.

However, each of these Wi-Fi access networks covers only a limited small area such as a building, and a consumer is not always allowed to access a Wi-Fi access network to connect to the Internet. For example, a user having a subscription at a T-MOBILE® hotspot at STARBUCKS® is not allowed to access an EARTHLINK® hotspot at a BARNES & NOBLE® bookstore. Currently there is no sharing mechanism/approach exist among individual Wi-Fi access networks.

The present invention contemplates a new and improved that resolves the above-referenced difficulties and others.

SUMMARY OF THE INVENTION

With the invention disclosed herein, individual, small Wi-Fi access networks will be virtually transparent to a consumer. By using the same access ID and password, the end user will be able to access the Wi-Fi networks to a greater extent as long as there are individual Wi-Fi access networks existing around the end user.

In one aspect of the invention a method of providing virtual Wi-Fi service via a virtual Wi-Fi access network is provided. The method comprises: receiving data from an owner of an individual Wi-Fi access point; updating the owner of the Wi-Fi access point with access IDs, passwords, and security keys for a plurality of virtual Wi-Fi access subscribers; receiving subscriber data from a virtual Wi-Fi access subscriber; providing the subscriber with virtual Wi-Fi access log-in information; connecting the subscriber to the virtual Wi-Fi access network, wherein the virtual Wi-Fi access network comprises a plurality of individual Wi-Fi access points in communication with at least one virtual Wi-Fi access server; and billing the subscriber for virtual Wi-Fi access.

In another aspect of the invention an apparatus for providing virtual Wi-Fi service via a virtual Wi-Fi access network is provided. The apparatus comprises: a virtual Wi-Fi access server operative to: receive data from an owner of an individual Wi-Fi access point; update the owner of the Wi-Fi access point with access IDs, passwords, and security keys for a plurality of virtual Wi-Fi access subscribers; receive subscriber data from a virtual Wi-Fi access subscriber; provide the subscriber with virtual Wi-Fi access log-in information; connect the subscriber to the virtual Wi-Fi access network, wherein the virtual Wi-Fi access network comprises a plurality of individual Wi-Fi access points in communication with the virtual Wi-Fi access server; and bill the subscriber for virtual Wi-Fi access. The apparatus further comprises a database for storing data related to virtual Wi-Fi access service in communication with the virtual Wi-Fi access server.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

Figure 1:
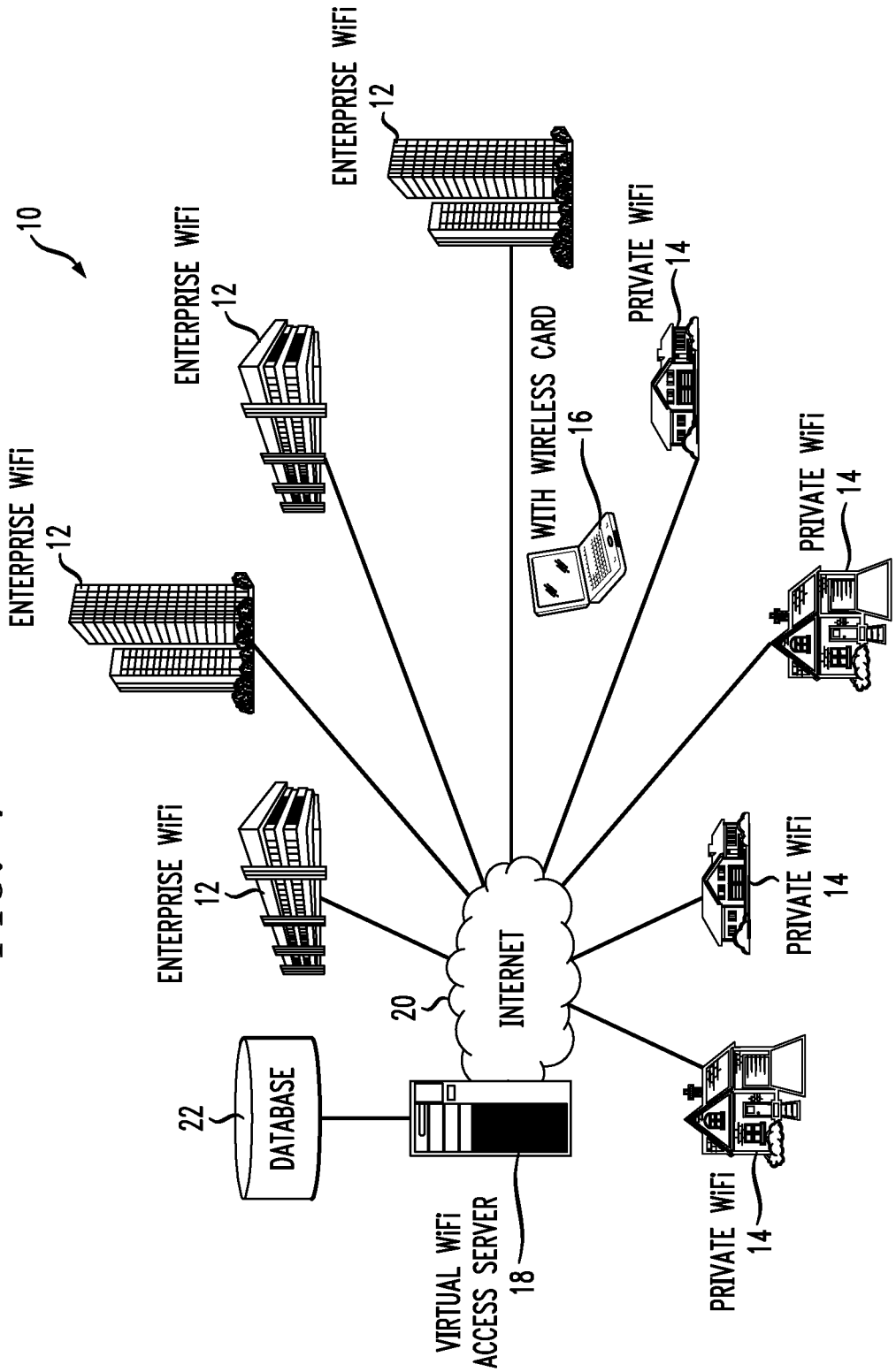
FIG. 1 is a block diagram of a network that provides shared Wi-Fi access services in accordance with aspects of the present invention.

Referring now to the drawings wherein the showings are for purposes of illustrating the exemplary embodiments only and not for purposes of limiting the claimed subject matter, FIG. 1 provides a view of a system 10 into which the presently described embodiments may be incorporated. As shown generally, FIG. 1 includes any number of enterprise Wi-Fi access points (or routers or devices) 12 and private Wi-Fi access points (or routers or devices) 14 for a subscriber with a device 16 having a wireless card. Each of the various access points may be associated with a given service provider or with different service providers. Thus, with this invention it is possible to coordinate shared Wi-Fi service among the individual Wi-Fi access points. To that end, the various enterprise Wi-Fi access points 12 and private Wi-Fi access points 14 are connected to a virtual Wi-Fi access server 18 via the Internet 20. Collectively, these access points, along with the virtual Wi-Fi server 18, constitute a virtual (or shared) Wi-Fi access network, as described more fully below. The subscriber may be using any Wi-Fi enabled device 16 such as a PC, game console, cell phone, MP3 player or PDA that can connect to the Internet when within range of a wireless network connected to the Internet.

Each individual private or enterprise owned Wi-Fi access point (12/14) has at least one spare channel (or resource) that can be shared by other users not belonging to the family or the customers of the enterprise. By agreeing to share such spare channels/resources, a private or enterprise owned Wi-Fi access point (12/14) may be connected to the virtual Wi-Fi access server 18 and set-up with a virtual Wi-Fi access ID and password for the spare channels.

Each individual Wi-Fi access point (12/14) is able to send an indication with a radio signal that indicates whether this Wi-Fi access point is able to share spare channels/resources. When the traffic to and from this access point exceeds a pre-defined limit, the Wi-Fi router/device will set up a "not sharable" indication message. When the traffic is under the limit, the Wi-Fi router/device will set up a "sharable" indication message.

The Wi-Fi access server 18 generally includes a CPU (not shown) such as a microprocessor or a secure server, and is in communication with a special database 22 for storing pertinent information for Wi-Fi access.

Figure 2:
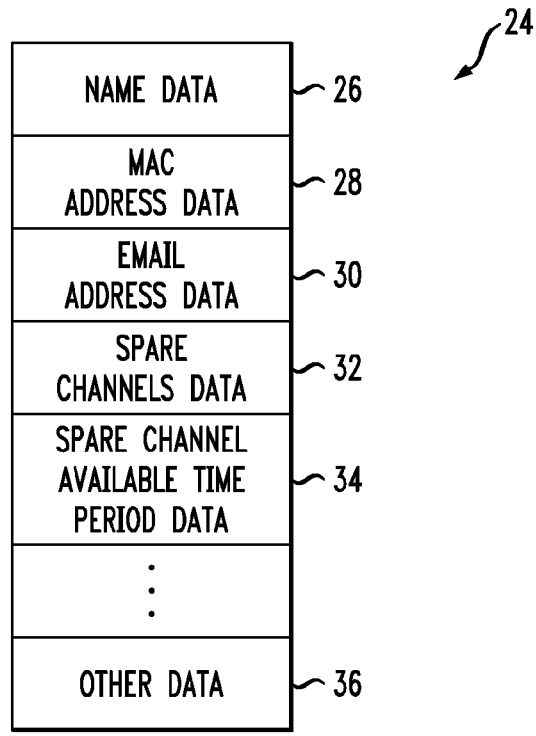
FIG. 2 is a memory layout of data stored in the database for Wi-Fi access points in accordance with aspects of the present invention.

The database 22 generally includes any number of data sub-blocks for each Wi-Fi access point, as shown in FIG. 2. They are shown as a super block 24, not all of whose fields are filled for a particular Wi-Fi access point. The super block 24, as known in the art, can be accessed from the identity of any one of several fields within it. The super block 24 includes any number of data sub-blocks, including a first sub-block 26 that contains owner name data, a second sub-block 28 that contains MAC address data, a third sub-block 30 that contains email address data, a fourth sub-block 32 that contains available spare channels data, and a fifth sub-block 34 that contains spare channel available time period data. Of course, any number of additional sub-blocks 36 may be provided in the super block 24 for storing other pertinent data.

Figure 3:
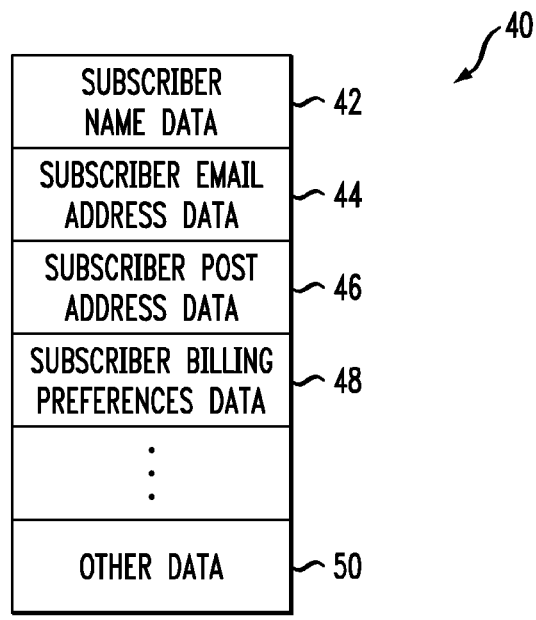
FIG. 3 is a memory layout of data stored in the database for virtual Wi-Fi access subscribers in accordance with aspects of the present invention.

The database 22 may also store Wi-Fi access data for subscribers in a Wi-Fi access subscriber record 40, as shown in FIG. 3. Such a record 40 is shown as a super data block, not all of whose fields (or data sub-blocks) are filled for a particular subscriber. As shown, the super block 40 includes any number of data sub-blocks, including a first sub-block 42 that contains subscriber name data, a second sub-block 44 that contains subscriber email address data, a third sub-block 46 that contains subscriber post address data, and a fourth sub-block 48 that contains subscriber billing preferences data. Of course, it is to be understood that any number of additional sub-blocks 50 may be provided in the super block 40 for storing other data.

By sharing the spare channels/resources, the individual Wi-Fi access point owner will also have an opportunity to share a portion of the revenue with the provider of the virtual Wi-Fi access service.

Figure 4:
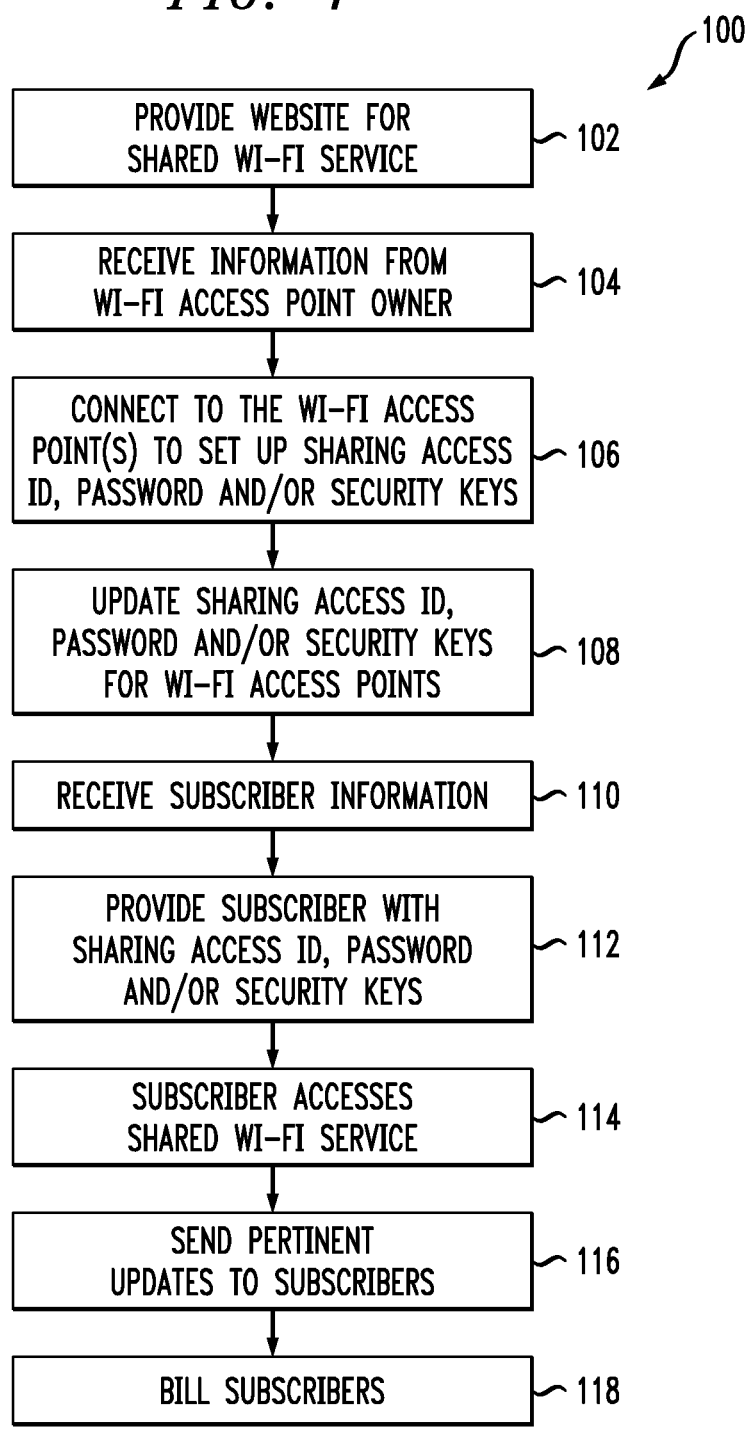
FIG. 4 is a flow chart illustrating a method of providing virtual Wi-Fi access services in accordance with aspects of the present invention.

An exemplary method 100 of providing shared Wi-Fi service to a subscriber is outlined in FIG. 4. In order to provide this service, the virtual Wi-Fi access server 18 is linked to a website that allows each individual Wi-Fi access point owner to sign up for sharing the spare channels and share the revenue with the applicable service providers (102).

In order to provide this service, the virtual Wi-Fi access server 18 is linked to a website that allows each individual Wi-Fi access point owner to sign up for virtual (shared) Wi-Fi service and thus share any spare channels and corresponding revenue generated with the applicable service providers (102).

The individual Wi-Fi access point owner goes to the website to sign up for the Wi-Fi access sharing service by providing, among other things, the Wi-Fi access router/device's MAC address (104).

The information is downloaded to the virtual Wi-Fi access server 18, which stores the information in the database 22 and also connects to the individual Wi-Fi access points to set up the sharing access ID, password, and/or security keys for the subscribers (106).

The set-up procedure outlined in the previous three steps may be repeated for each Wi-Fi access point/router/device that is willing to share spare channels.

All individual Wi-Fi access points signing up for the sharing resource system may be setup for the same access ID, password and/or security keys for the spare channels. Of course, it is to be understood that other feasible implementations in the virtual Wi-Fi access server 18 may be contemplated, such as (1) using secure token to provide accessing password; and (2) using secure key authentication without user access ID and password.

The virtual Wi-Fi access server 18 periodically updates the sharing/virtual access ID, password and/or security keys for all signed up individual Wi-Fi access points (108). Such access ID and password updates may be done on a weekly or monthly basis, for example.

Once the shared Wi-Fi access service has been established, an end user may subscribe to the exemplary virtual Wi-Fi access service by paying a monthly fee in exchange for a Wi-Fi sharing access ID and a password. In this regard, the end user does not need to sign up for hotspot access service with multiple service providers. The end user only needs to sign up for Wi-Fi access service with one virtual Wi-Fi access service provider, therefore being able to access the Internet from any area that has individual Wi-Fi access point/router/device which offers spare channel sharing, in the event there are no public/free Wi-Fi access points in the vicinity. Some examples of such areas are hotels, coffee shops, bookstores, libraries, etc. Thus, pertinent subscriber information is received via the website (110).

Each end user subscribed to the virtual Wi-Fi access service is then provided with the sharing access ID, password and/or security keys via the website or other means (e.g., e-mail, text message, etc.) (112).

With the sharing access ID and password, the new subscriber may now select one of the available sharing Wi-Fi access points (114). Generally, the subscriber user equipment determines which signals are available and selects the strongest Wi-Fi signal.

Whenever the sharing access ID, password or security key is changed, the virtual Wi-Fi access server 18 sends the update to the subscribers via suitable means such as e-mail or a text message (116).

Such virtual Wi-Fi access service subscriptions can be charged with a flat rate on a monthly basis (118). If the subscriber decides to terminate the service, the subscriber will not receive the updated sharing access ID, password and/or security key.

In summary, this invention offers an end user a virtual Wi-Fi access service that is not restricted to certain type business/enterprise, such as a STARBUCKS® or a HYATT® hotel. With the virtual Wi-Fi access service, a user with a wireless access capability can always select one of the surrounding available Wi-Fi networks to access the internet. Such virtual Wi-Fi access service provides benefit and revenue for both virtual Wi-Fi access service provider and individual Wi-Fi access point owner. Further, such virtual Wi-Fi access service offers the subscriber freedom not to be tied to certain hotspot service providers. With this invention, both private and enterprise Wi-Fi access point owners can share their spare Wi-Fi resource to third parties, which will significantly save city/town capital/investment in building public and free WLAN network. With this invention, the virtual Wi-Fi access service provider can gain profit and share a portion of the revenue with private and enterprise Wi-Fi access points, as a win-win solution to all parties.

Each private or enterprise owned Wi-Fi access point/router/device will make its spare channel sharable to a 3rd party virtual Wi-Fi access network service provider. Such sharing will allow the virtual Wi-Fi access network server to connect to private or enterprise owned Wi-Fi access point/router/device and setup an access ID with password for the spare channels. An end user subscribed to virtual Wi-Fi access service will be given such an access ID and password to access any individual Wi-Fi networks around the user that are sharing with the virtual Wi-Fi access network.

In this virtual Wi-Fi access service framework/architecture, each individual private or enterprise owned Wi-Fi access point/router/device is connected to the virtual Wi-Fi access server via the Internet. The end user's laptop/device with wireless connection capability will be able to access one of the surrounding individual Wi-Fi networks with a single unique access ID and password provided by the virtual Wi-Fi access service provider.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method of providing virtual Wi-Fi service via a virtual Wi-Fi access network, the method comprising:
   receiving data from a plurality of individual privately and enterprise owned Wi-Fi access point owners at a virtual Wi-Fi access server and storing the access point owner data in a virtual Wi-Fi access database;
   updating the owners of the Wi-Fi access points with access IDs, passwords, and security keys for a plurality of virtual Wi-Fi access subscribers via the virtual Wi-Fi access server;
   receiving subscriber data from the plurality of virtual Wi-Fi access subscribers at the virtual Wi-Fi access server and storing the subscriber data in a virtual Wi-Fi access database, wherein the virtual Wi-Fi access server provides subscribers with virtual Wi-Fi access service with a virtual Wi-Fi access service provider;
   providing the subscribers with virtual Wi-Fi access log-in information via the virtual Wi-Fi access server;
   receiving an indication from at least one private or enterprise owned Wi-Fi access point that it is able to share at least one spare channel or resource with a Wi-Fi user not belonging directly to the private or enterprise owned access point based on a pre-defined traffic limit;
   connecting one or more of the subscribers to the virtual Wi-Fi access network via the virtual Wi-Fi access server after authentication with the virtual Wi-Fi access server, wherein the virtual Wi-Fi access network comprises the plurality of individual Wi-Fi access points in communication with the virtual Wi-Fi access server; and
   billing the subscribers for virtual Wi-Fi access via the virtual Wi-Fi access server.

2. The method of claim 1, wherein the Wi-Fi access points comprise at least one of an enterprise access point or a private access point.

3. The method of claim 1, further comprising:
   receiving a request at the virtual Wi-Fi access server for authentication of a subscriber's device when the subscriber's device is near one or more Wi-Fi access points that are secured and not publicly accessible;
   if the subscriber is in the virtual Wi-Fi access database, sending a message to the private Wi-Fi access point confirming the subscriber's registration status.

4. The method of claim 1, wherein the database stores data relating to individual access points, the data comprising:

owner name data, MAC address data, owner email address data, available spare channels data, and spare channel available time period data.

5. The method of claim 4, wherein the database stores virtual Wi-Fi access subscriber data, the data comprising: subscriber name data, subscriber email address data, subscriber post address data, and subscriber billing preferences data.

6. An apparatus for providing virtual Wi-Fi service via a virtual Wi-Fi access network, the apparatus comprising:
a virtual Wi-Fi access server that is programmed to:
receive data from a plurality of individual privately and enterprise owned Wi-Fi access point owners;
update the owners of the Wi-Fi access points with access IDs, passwords, and security keys for a plurality of virtual Wi-Fi access subscribers;
receive subscriber data from a virtual Wi-Fi access subscriber, wherein the virtual Wi-Fi access server provides subscribers with virtual Wi-Fi access service with a virtual Wi-Fi access service provider;
provide the subscriber with virtual Wi-Fi access log-in information;
receive an indication from at least one private or enterprise owned Wi-Fi access point that it is able to share at least one spare channel or resource with a Wi-Fi user not belonging directly to the private or enterprise owned access point based on a pre-defined traffic limit;
connect one or more of the subscribers to the virtual Wi-Fi access network, wherein the virtual Wi-Fi access network comprises the plurality of individual Wi-Fi access points in communication with the virtual Wi-Fi access server; and
bill the subscribers for virtual Wi-Fi access; and
a database that stores data related to virtual Wi-Fi access service in communication with the virtual Wi-Fi access server, wherein the data includes access point owner data and subscriber data.

7. The apparatus of claim 6, wherein the database stores data relating to individual access points, the data comprising: owner name data, MAC address data, owner email address data, available spare channels data, and spare channel available time period data.

8. The apparatus of claim 7, wherein the database stores virtual Wi-Fi access subscriber data, the data comprising: subscriber name data, subscriber email address data, subscriber post address data, and subscriber billing preferences data.

* * * * *